US007159107B2

(12) United States Patent
Chen et al.

(10) Patent No.: US 7,159,107 B2
(45) Date of Patent: Jan. 2, 2007

(54) BOOTING METHOD CAPABLE OF EXECUTING A WARM BOOT OR A COLD BOOT WHEN A CPU CRASH OCCURS AND COMPUTER SYSTEM THEREFOR

(75) Inventors: Jen-De Chen, Taoyuan (TW); Ying-Chieh Kuo, Taoyuan (TW)

(73) Assignee: High Tech Computer Corp., Taoyuan (TW)

( * ) Notice: Subject to any disclaimer, the term of this patent is extended or adjusted under 35 U.S.C. 154(b) by 416 days.

(21) Appl. No.: 10/771,904

(22) Filed: Feb. 4, 2004

(65) Prior Publication Data

US 2005/0055598 A1 Mar. 10, 2005

(30) Foreign Application Priority Data

Sep. 4, 2003 (TW) .............................. 92124524 A

(51) Int. Cl.
*G06F 15/177* (2006.01)

(52) U.S. Cl. ............................................ 713/2; 714/15

(58) Field of Classification Search .................... 713/2; 714/15

See application file for complete search history.

(56) References Cited

U.S. PATENT DOCUMENTS 5,333,285 A * 7/1994 Drerup ........................ 714/23
5,586,334 A 12/1996 Miyakazi et al. ........... 395/750
5,694,600 A * 12/1997 Khenson et al. ............... 713/2
5,850,546 A * 12/1998 Kim .............................. 713/1
6,061,788 A 5/2000 Reynaud et al. ............... 713/2
6,098,158 A 8/2000 Lay et al. .................... 711/162
2002/0042889 A1 4/2002 Takahasi et al. ............ 713/320

OTHER PUBLICATIONS

"LH75400/01/10/11 System-On-Chip Preliminary User's Guide" XP002319152, Sharp, Jul. 15, 2003.
"Advanced Configuation and Power Interface Specification" XP002319153, Compaq Computer Corp. et al., Aug. 25, 2003.

* cited by examiner

*Primary Examiner*—Thuan Du
(74) *Attorney, Agent, or Firm*—Thomas, Kayden, Horstemeyer & Risley

(57) ABSTRACT

A booting method capable of executing a warm boot or a cold boot when a CPU crash occurs in a computer system having a CPU and a memory. First, when the CPU is in a crash state, it is detected that a user wants to execute a hardware reset function or a software reset function. Next, a hardware reset operation is executed to reboot the CPU. Then, when the user chooses to execute the hardware reset function, data and predefined values of the memory are deleted to make the computer system return to a default state. Thereafter, when the user chooses to execute the software reset function, the hardware reset operation is regarded as an operation to replace a software reset operation, and the computer system holds the data and predefined values to make the computer system return to a setting state before the computer system is crashed.

10 Claims, 6 Drawing Sheets

BOOTING METHOD CAPABLE OF EXECUTING A WARM BOOT OR A COLD BOOT WHEN A CPU CRASH OCCURS AND COMPUTER SYSTEM THEREFOR

This application claims the benefit of Taiwan application Ser. No. 92124524, filed Sep. 4, 2003.

BACKGROUND OF THE INVENTION

1. Field of the Invention

The invention relates to a booting method and a computer system therefor, and more particularly to a booting method capable of executing a warm boot or a cold boot when a CPU crash occurs and a computer system therefor.

2. Description of the Related Art

In general, a computer system always provides a hardware reset function and a software reset function to enable the computer system to execute a cold boot and a warm boot, respectively. After the computer system is crashed, a user may choose the hardware reset function or the software reset function to reboot the computer system.

The software reset function is such that a system reset operation is executed by means of software. However, the software reset function is disabled when a CPU (Central Processing Unit) of the computer system is crashed and cannot execute a software instruction. The hardware reset function is such that the reset operation for the computer system is executed by means of hardware. Thus, the hardware reset function is always enabled regardless of whether the CPU is crashed or not. After the software reset function has been executed, the computer system has been warm-booted. That is, the computer system will be rebooted, and the settings and data stored in an SDRAM (Synchronous Dynamic Random Access Memory) of the computer system before the computer system is crashed still exist. After the hardware reset function has been executed, the computer system has been cold-booted. That is, the computer system will be rebooted and return to its default state when it is manufactured, and all the settings and data stored in the SDRAM before the computer system is crashed will be lost.

FIG. 1 is a main architecture diagram showing a conventional computer system. The conventional computer system 100 includes a CPU 102, an SDRAM 104, a software reset generating circuit 106, and a hardware reset generating circuit 108. Data and predefined values for the computer system 100 are stored in the SDRAM 104 controlled by the CPU 102. The software reset generating circuit 106 transfers a software reset signal SR to the CPU 102 to enable the CPU 102 to execute a software reset operation when a user chooses to execute the software reset function. The hardware reset generating circuit 108 transfers a hardware reset signal HR to the CPU 102 to enable the CPU 102 to execute a hardware reset operation when the user chooses to execute the hardware reset function.

FIG. 2 is a flow chart showing a booting method capable of executing a warm boot or a cold boot in a conventional computer system. First, step 202 is performed to judge whether or not the CPU 102 is crashed. If yes, step 204 is performed; and if not, step 206 is performed. In the step 204, the CPU 102 cannot execute the software reset operation because it is crashed. Thus, the user can only choose the hardware reset function. After the step 204, the process goes to step 208, in which the computer system 100 is cold-booted, and all the data and predefined values stored in the SDRAM 104 will be lost.

When the CPU 102 is not crashed, the user may choose the hardware reset function or the software reset function. Thus, in the step 206, the computer system 100 judges that the user chooses the hardware reset function or the software reset function. If the user chooses the software reset function, step 210 is then performed, in which the computer system 100 is warm-booted, and all the data and predefined values stored in the SDRAM 104 will be held. If the user chooses the hardware reset function, step 208 is performed.

The conventional computer system 100 cannot execute the software reset operation but can only execute the hardware reset operation to finish the cold boot when the CPU 102 is crashed. After the computer system 100 is cold-booted, however, the data and the predefined values of the computer system 100 stored in the SDRAM 104 before the computer system is crashed will be completely lost. Then, the user has to set the computer system 100 again, which is quite time-consuming. In addition, important data may be lost, which causes great damage to the user.

SUMMARY OF THE INVENTION

It is therefore an object of the invention to provide a booting method capable of executing a warm boot or a cold boot when a CPU crash occurs and a computer system therefor. When the CPU is crashed, the invention enables the user to choose the software reset function to execute a warm boot. Thus, the data and predefined values stored in the SDRAM before the computer system is crashed may be held. Accordingly, the drawback of losing important data in the prior art may be avoided, and the time consumption in resetting the computer system may be eliminated.

The invention achieves the above-identified object by providing a booting method capable of executing a warm boot or a cold boot when a CPU crash occurs in a computer system. The computer system has a CPU and a memory. The CPU controls the memory, and the memory stores data and predefined values of the computer system. The booting method of the invention includes the following steps. First, when the CPU is in a crash state, the computer system detects that a user wants to execute a hardware reset function or a software reset function. Next, a hardware reset operation is executed to reboot the CPU. Then, when the user chooses to execute the hardware reset function, data and predefined values of the memory are deleted to make the computer system return to a default state. Otherwise, when the user chooses to execute the software reset function, the computer system holds the data and predefined values to make the computer system return to a setting state before the computer system is crashed.

The invention also achieves the above-identified object by providing a computer system capable of executing a warm boot or a cold boot when a CPU crash occurs. The computer system includes a CPU, a memory, a judgement-combination circuit, a hardware reset combination circuit, a software reset generating circuit and a hardware reset generating circuit. The memory controlled by the CPU stores data and predefined values of the computer system. The judgement-combination circuit judges whether or not the CPU is crashed. The hardware reset combination circuit is electrically connected to the CPU and is controlled by the judgement-combination circuit. The software reset generating circuit transfers a software reset signal to the CPU and the judgement-combination circuit when the user chooses to execute the software reset function. The hardware reset generating circuit transfers a first hardware reset signal to the judgement-combination circuit and the hardware reset combination circuit when the user chooses to execute the hardware reset function. When the judgement-combination circuit receives the software reset signal and the CPU is judged to be in a crash state, the judgement-combination circuit controls the hardware reset combination circuit to output a second hardware reset signal to the CPU so as to reboot the CPU. Thereafter, the judgement-combination circuit transfers a judgement signal to the CPU to inform the CPU that the second hardware reset signal is an indication signal to replace the software reset signal. Then, the computer system holds the data and predefined values of the memory to make the computer system return to a setting state before the CPU crash. When the hardware reset combination circuit receives a hardware reset signal, the hardware reset combination circuit transfers a second hardware reset signal to the CPU so as to reboot the CPU. The CPU deletes the data and predefined values of the memory to make the computer system return to a default state.

Other objects, features, and advantages of the invention will become apparent from the following detailed description of the preferred but non-limiting embodiments. The following description is made with reference to the accompanying drawings.

DETAILED DESCRIPTION OF THE INVENTION

The main scope of a booting method capable of executing a warm boot or a cold boot when a CPU crash occurs in a computer system of the invention is described in the following. When the CPU is crashed, the computer system detects a hardware reset function or a software reset function to be executed by a user. Then, the CPU is rebooted by executing the hardware reset operation. Next, when the user chooses to execute the hardware reset function, the data and predefined values stored in the SDRAM are deleted to make the computer system return to its default state. When the user chooses to execute the software reset function, the hardware reset operation, which is regarded as an operation to replace the software reset operation, is executed to cause the computer system to hold the data and predefined values stored in the SDRAM, and make the computer system return to a setting state before the crash. In the invention, the user may still execute the warm boot to hold the data and predefined values stored in the SDRAM when the CPU is crashed.

Figure 1:
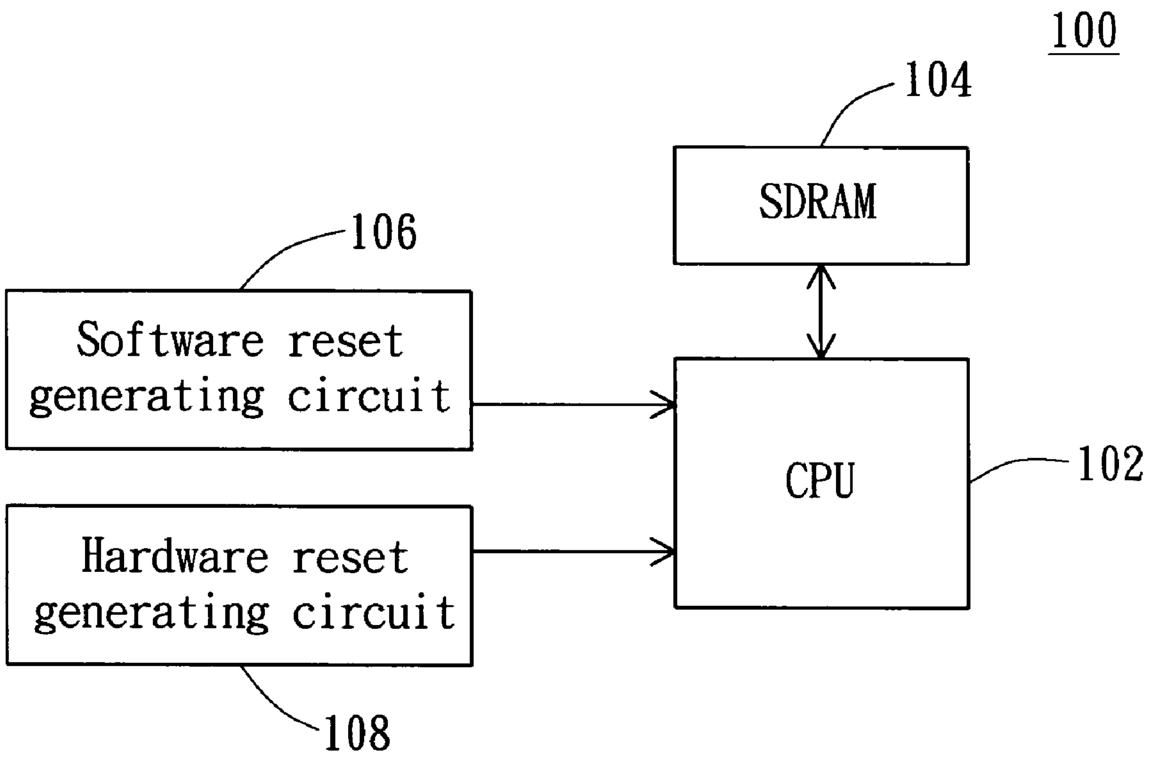
FIG. 1 is a main architecture diagram showing a conventional computer system.
Figure 2:
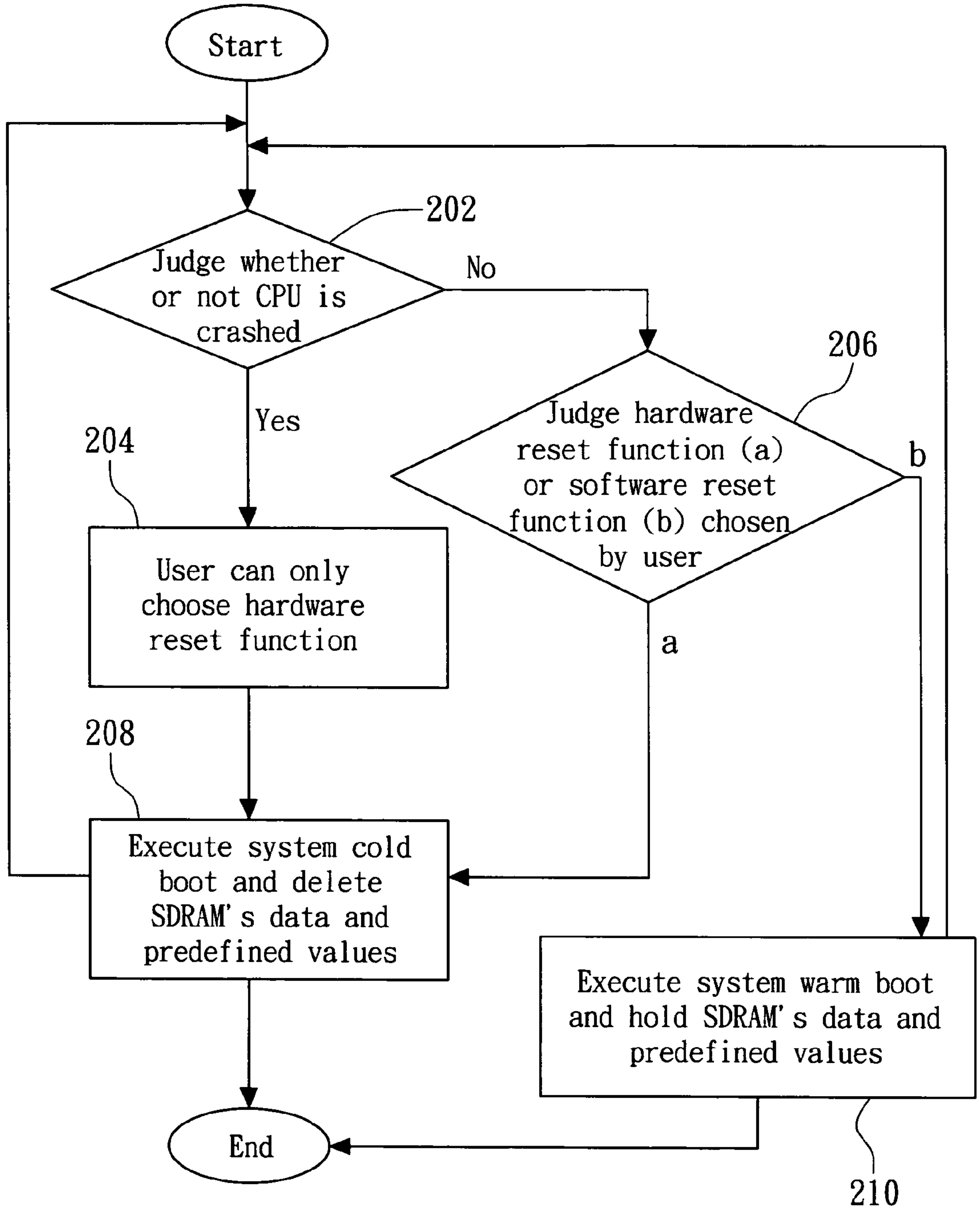
FIG. 2 is a flow chart showing a booting method capable of executing a warm boot or a cold boot in a conventional computer system.
Figure 3:
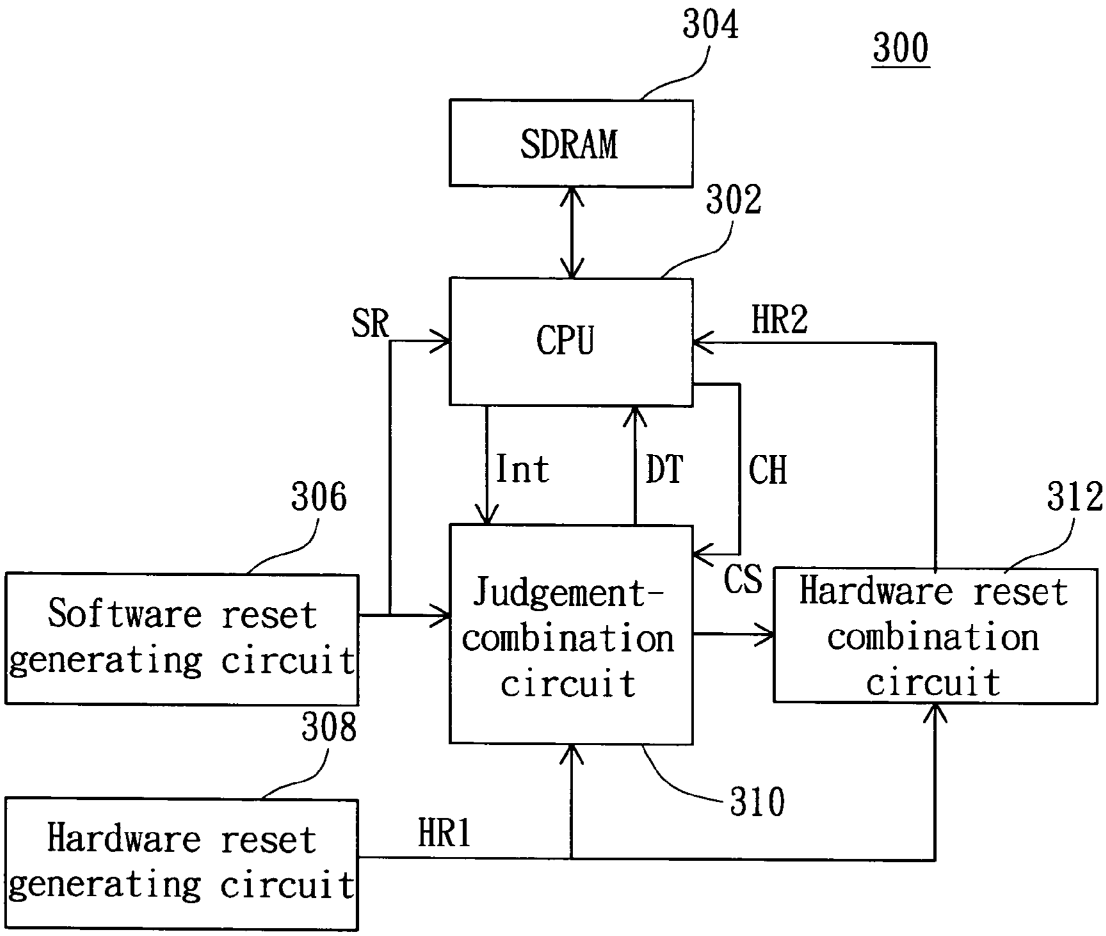
FIG. 3 is an architecture diagram showing a computer system for executing a warm boot or a cold boot when a CPU crash occurs according to a preferred embodiment of the invention.

FIG. 3 is an architecture diagram showing a computer system for executing a warm boot or a cold boot when a CPU crash occurs according to a preferred embodiment of the invention.

The computer system 300 of the invention includes a CPU 302, an SDRAM 304, a judgement-combination circuit 310, a hardware reset combination circuit 312, a software reset generating circuit 306, and a hardware reset generating circuit 308. The SDRAM 304 controlled by the CPU 302 stores data and predefined values of the computer system 300. The judgement-combination circuit 310 judges whether or not the CPU 302 is crashed according to a crash signal CH. The hardware reset combination circuit 312 is electrically connected to the CPU 302 and is controlled by the judgement-combination circuit 310. When a user chooses to execute the software reset function, the software reset generating circuit 306 transfers a software reset signal SR to the CPU 302 and the judgement-combination circuit 310 to inform them that the user wants the computer system 300 to execute the software reset operation. When the user chooses to execute the hardware reset function, the hardware reset generating circuit 308 transfers a first hardware reset signal HR1 to the judgement-combination circuit 310 and the hardware reset combination circuit 312 to inform them that the user wants the computer system 300 to execute the hardware reset operation.

When the judgement-combination circuit 310 receives the software reset signal SR and judges that the CPU 302 is crashed by the crash signal CH, the judgement-combination circuit 310 outputs a control signal CS to the hardware reset combination circuit 312 to inform it to execute the hardware reset operation. At this time, the hardware reset combination circuit 312 outputs a second hardware reset signal HR2 to the CPU 302 so as to reboot the CPU. Thereafter, the judgement-combination circuit transfers a judgement signal DT to the CPU so as to inform the CPU 302 that the second hardware reset signal HR2 is an indication signal to replace the software reset signal. Then, the computer system 300 holds the data and predefined values of the SDRAM 304 to make the computer system 300 return to the setting state before the crash. Otherwise, when the hardware reset combination circuit 312 receives the hardware reset signal HR1, the hardware reset combination circuit 312 transfers a second hardware reset signal HR2 to the CPU 302 so as to reboot the CPU 302 and enable the CPU 302 to execute the hardware reset operation. The CPU 302 deletes the data and predefined values of the SDRAM 304 to make the computer system 300 return to its default state.

Figure 4A:
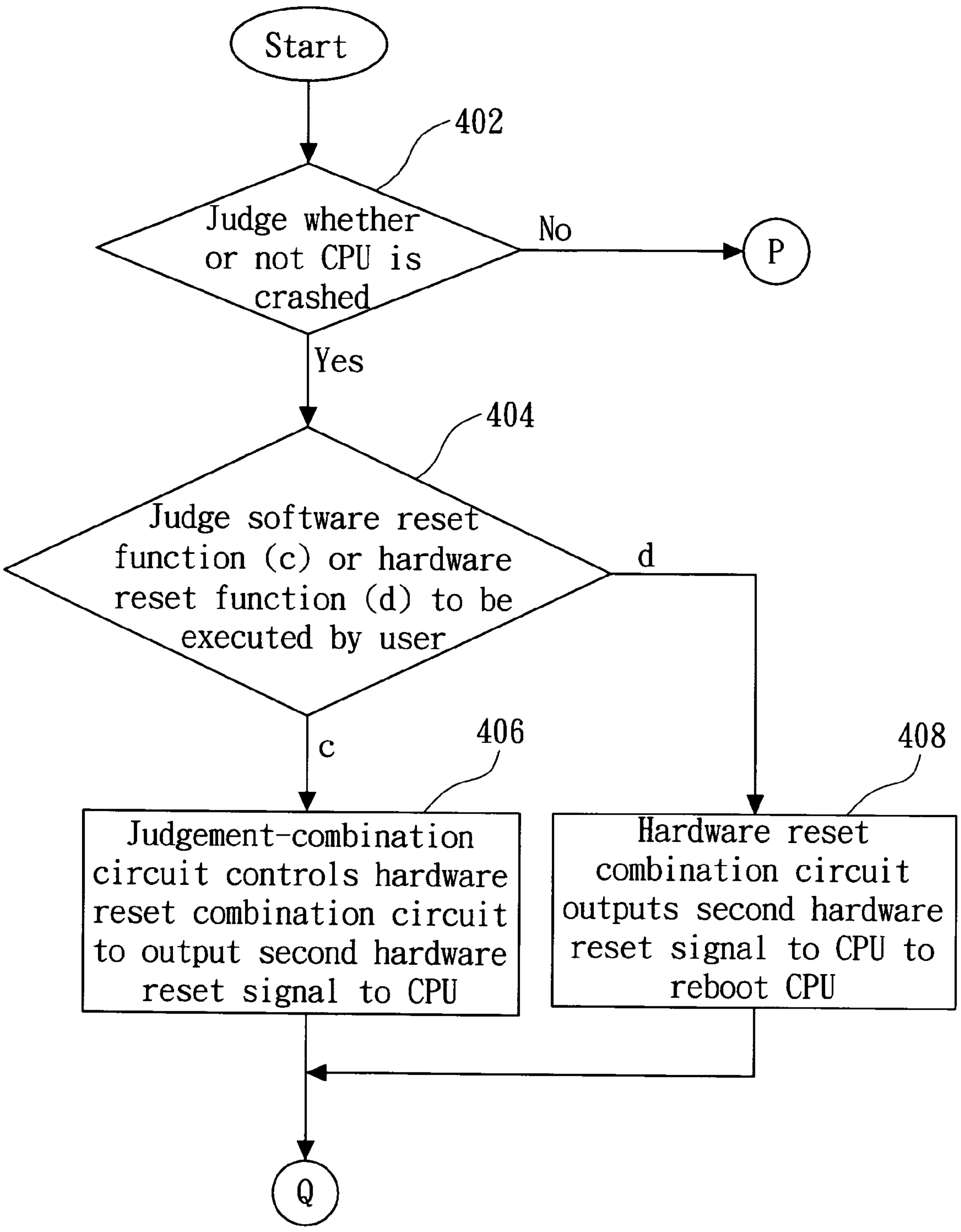
FIGS. 4A to 4C are detailed flow charts showing a booting method of the invention.
Figure 4B:
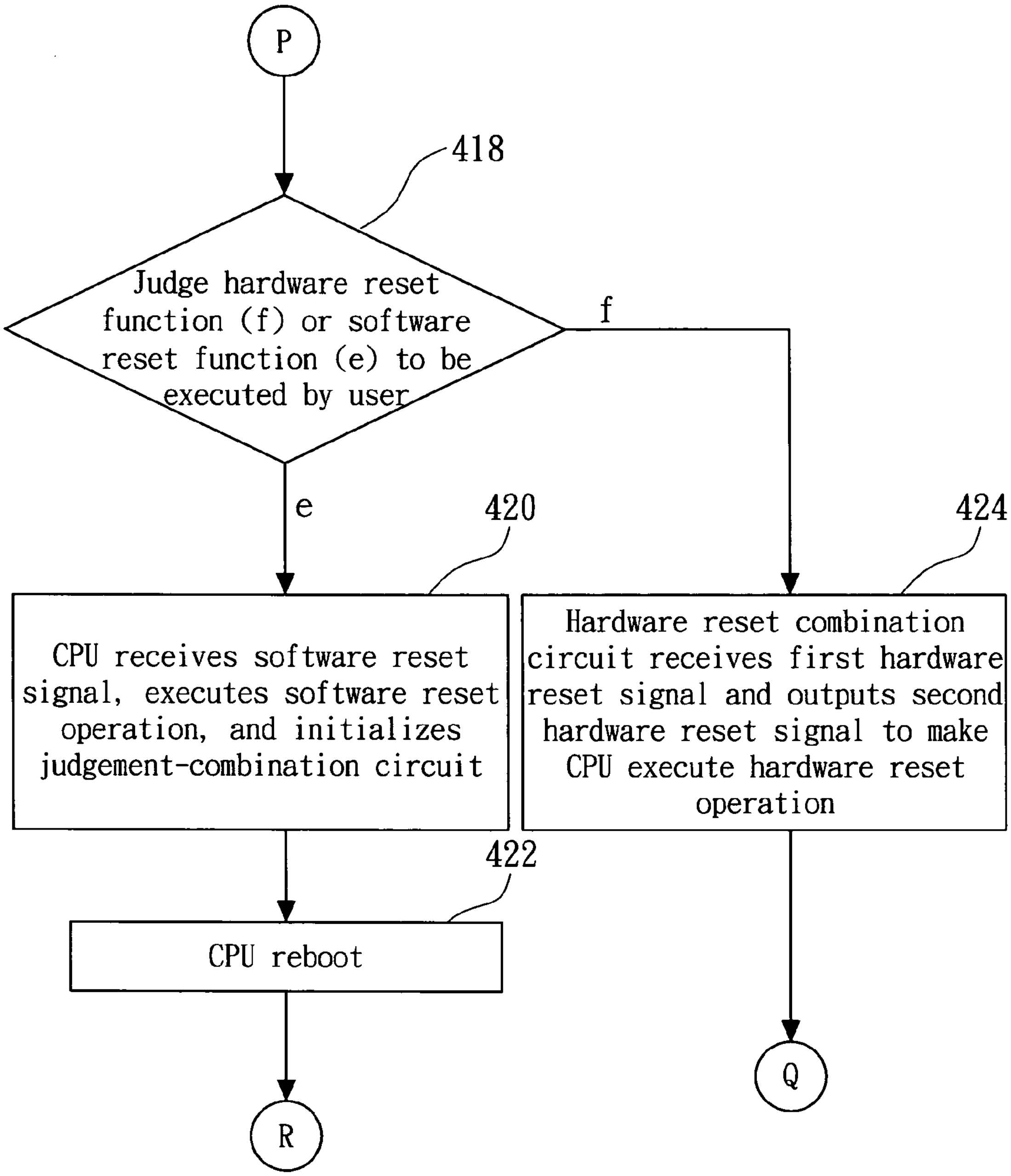
Figure 4C:
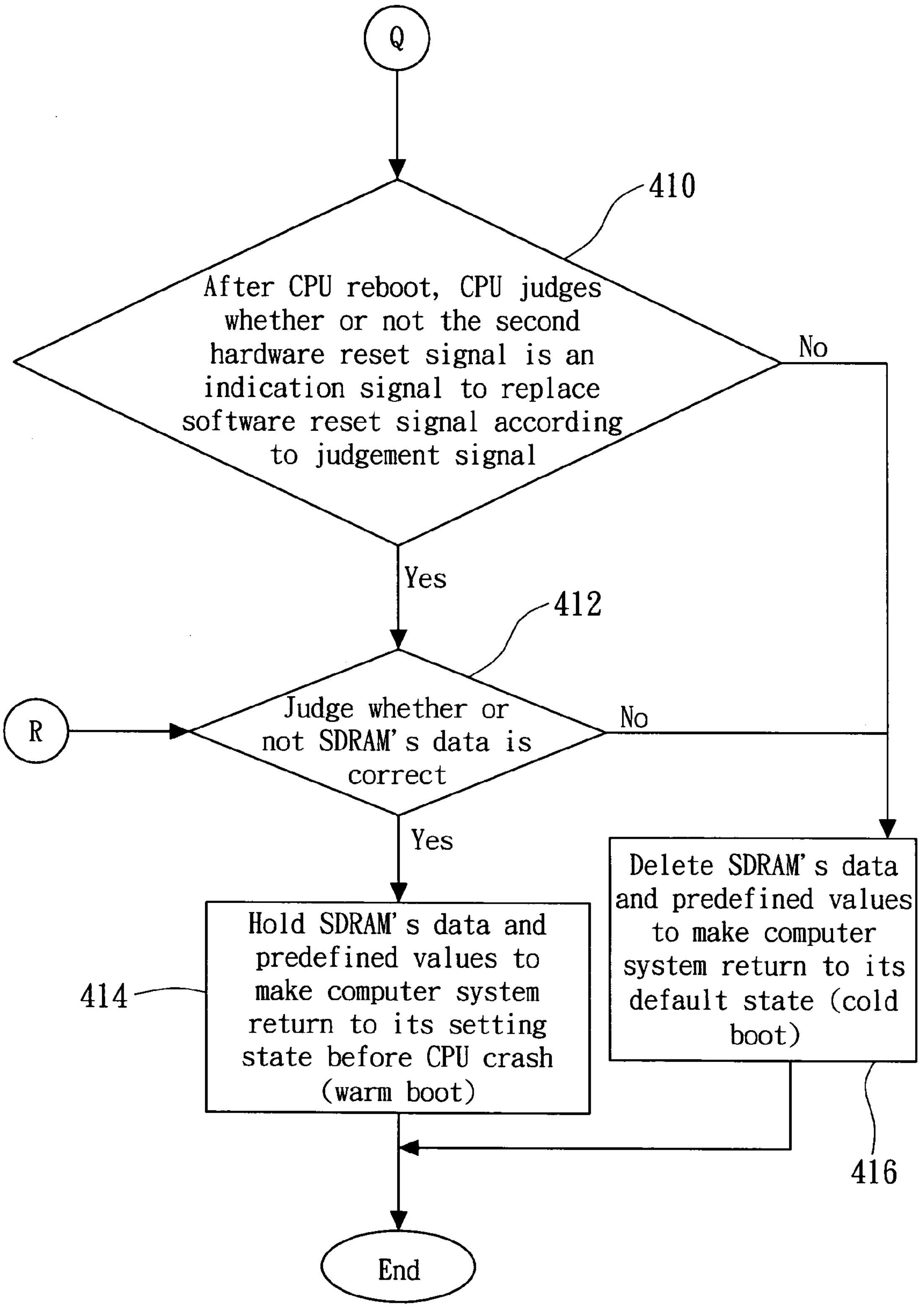

FIGS. 4A to 4C are detailed flow charts showing a booting method of the invention. Please refer to FIGS. 4A to 4C in conjunction with FIG. 3. The booting method of the invention includes the following steps. First, step 402 is executed to judge whether or not the CPU 302 is in a crash state. The process goes to step 404 if yes, and to step 418 is not. Step 404 judges that a user wants to execute the hardware reset function or the software reset function. When the user wants to execute the software reset function, the process goes to step 406; and when the user wants to execute the hardware reset function, the process goes to step 408.

Steps 406 to 410 are steps for executing a part of the hardware reset operation to replace a part of the software reset operation, wherein the part of the hardware reset operation means that only the hardware reset operation is used to make the CPU 302 return to its normal state for executing software programs. Then, the CPU 302 determines whether or not the contents in the SDRAM 304 are to be deleted according to the judgement signal DT, thereby executing the complete hardware reset operation or software reset operation.

In step 406, after the judgement-combination circuit 310 receives the software reset signal SR and finds that the CPU is in a crash state according to the crash signal CH, the judgement-combination circuit 310 outputs the control signal CS to control the hardware reset combination circuit 312 to output the second hardware reset signal HR2 to the CPU 302 so as to reboot the CPU 302, and then the process goes to step 410.

In step 408, after the hardware reset combination circuit 312 receives the first hardware reset signal HR1, the hardware reset combination circuit 312 outputs the second hardware reset signal HR2 to the CPU 302 so as to reboot the CPU 302, and then the process goes to step 410.

In step 410, after the CPU 302 is rebooted, the CPU 302 receives the judgement signal DT output from the judgement-combination circuit 310. If the CPU 302 finds that the second hardware reset signal HR2 is an indication signal to replace the software reset signal according to the judgement signal DT, the process goes to step 412. If the CPU 302 judges that the second hardware reset signal HR2 represents the indication signal for executing the hardware reset operation according to the judgement signal DT, the process goes to step 416. In step 410, the CPU 302 further outputs an initialization signal Int to initialize the judgement-combination circuit 310.

Step 412 judges whether or not the data in the SDRAM 304 is correct. If yes, the process goes to step 414, in which the data and predefined values of the SDRAM 304 are held to make the computer system 300 return to the setting state before the crash and thus complete the warm boot. If not, the process goes to step 416, in which the data and predefined values of the SDRAM 304 are deleted to make the computer system 300 return to its default state and thus complete the cold boot.

In addition, in step 402, after it is judged that the CPU 302 is not in a crash state, step 418 is performed to judge that the user wants to execute the hardware reset function or the software reset function. When the user wants to execute the software reset function, the process goes to step 420, in which the CPU 302 receives the software reset signal SR to execute the software reset operation, and outputs the initialization signal Int to initialize the judgement-combination circuit 310. Then, the process goes to step 422, in which the CPU 302 is rebooted and the data and predefined values in the SDRAM 304 will be held. When the user wants to execute the hardware reset function, step 424 is performed, in which the hardware reset combination circuit 312 receives the first hardware reset signal HR1 and outputs the second hardware reset signal HR2 to enable the CPU 302 to execute the hardware reset operation. At this time, the CPU 302 is rebooted, and the data and predefined values of the SDRAM 304 will be deleted.

The computer system 300 of the invention is preferably a personal digital assistant (PDA), and the operation system for the PDA is preferably the WinCE system. The SDRAM 304 also may be replaced by other memories having the same function as the SDRAM, so the invention is not limited to the usage of the SDRAM.

In the booting method capable of executing a warm boot or a cold boot when a CPU crash occurs and the computer system therefor according to the embodiments of the invention, when the CPU 302 is crashed and the user wants to execute the warm boot, the judgement-combination circuit 310 judges that the CPU 302 is in the crash state, automatically makes the CPU 302 return to its normal state by means of the hardware reset operation, and then informs the CPU 302 that the hardware reset operation is performed to replace the software reset operation. Thus, the data and predefined values in the SDRAM 304 may be held such that the computer system 300 may return to the state before the crash. From a user's viewpoint, the warm boot and cold boot may be chosen regardless of whether the CPU 302 is crashed or not, and whether or not the CPU is crashed does not influence the user's choice. Compared to the conventional method, in which the user can only choose the cold boot when the CPU is crashed, the invention enables the user to choose the warm boot when the CPU is crashed so as to save the data and predefined values stored in the SDRAM, prevent important data from being lost, and eliminate the time consumption of the user for resetting the computer system.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A booting method capable of executing a warm boot or a cold boot in a computer system when a CPU (Central Processing Unit) crash occurs, the computer system having a CPU and a memory, the CPU controlling the memory, the memory storing data and predefined values of the computer system, the booting method comprising the steps of:

(a) causing the computer system to detect whether a hardware reset function or a software reset function is selected when the CPU is in a crash state;

(b) when the hardware reset function is selected, rebooting the CPU by executing a hardware reset operation, and deleting the data and predefined values of the memory to make the computer system return to a default state; and (c) when the software reset function is selected, rebooting the CPU by executing a hardware reset operation, and regarding the hardware reset operation as a software reset operation to hold the data and predefined values of memory to make the computer system return to a setting state before the CPU crash.

2. The booting method according to claim 1, wherein the step (d) further comprises:

judging whether or not the data in the memory is correct;

enabling the computer system to hold the data and predefined values of the memory to make the computer system return to the setting state before the CPU crash if the data in the memory is correct; and deleting the data and predefined values of the memory to make the computer system return to the default state if the data in the memory is not correct.

3. The booting method according to claim 1, wherein the computer system is a PDA (personal digital assistant), the memory is an SDRAM (Synchronous Dynamic Random Access Memory), and an operation system of the PDA is a WinCE system.

4. A computer system capable of executing a warm boot or a cold boot when a CPU (Central Processing Unit) crash occurs, the computer system comprising:

a CPU;

a memory, controlled by the CPU, for storing data and predefined values of the computer system;

a judgement-combination circuit for judging whether or not the CPU is crashed;

a hardware reset combination circuit, which is electrically connected to the CPU and receives signals from the judgement-combination circuit;

a software reset generating circuit for transferring a software reset signal to the CPU and the judgement-combination circuit when a user chooses to execute a software reset function; and a hardware reset generating circuit for transferring a first hardware reset signal to the judgement-combination circuit and the hardware reset combination circuit when the user chooses to execute a hardware reset function, wherein:

when the judgement-combination circuit receives the software reset signal and judges that the CPU is in a crash state, the judgement-combination circuit controls the hardware reset combination circuit to output a second hardware reset signal to the CPU in order to reboot the CPU, and then transfers a judgement signal to the CPU to inform the CPU that the second hardware reset signal is an indication signal to replace the software reset signal, and then the computer system holds the data and predefined values of the memory to make the computer system return to a setting state before the CPU crash; and when the hardware reset combination circuit receives the first hardware reset signal, the hardware reset combination circuit transfers a second hardware reset signal to the CPU in order to reboot the CPU, and the CPU deletes the data and predefined values of the memory to make the computer system return to a default state.

5. The computer system according to claim 4, wherein:

before the computer system holds the data and predefined values of the memory, the computer system first executes an operation for judging whether or not the data in the memory is correct;

if yes, the computer system holds the data and predefined values of the memory to make the computer system return to the setting state before the CPU crash; and if not, the data and predefined values of the memory are deleted to make the computer system return to the default state.

6. The computer system according to claim 5, wherein the computer system is a PDA (personal digital assistant), the memory is an SDRAM (Synchronous Dynamic Random Access Memory), and an operation of the PDA is a WinCE system.

7. A booting method capable of executing a warm boot or a cold boot when a CPU (Central Processing Unit) crash occurs in a computer system, the computer system having a CPU, a memory, a judgement-combination circuit, a hardware reset combination circuit, a software reset generating circuit and a hardware reset generating circuit, the memory storing data and predefined values of the computer system and being controlled by the CPU, the judgement-combination circuit judging whether or not the CPU is crashed, the hardware reset combination circuit being electrically connected to the CPU and receives signals from the judgement-combination circuit, the software reset generating circuit transferring a software reset signal to the CPU and the judgement-combination circuit when a software reset function is selected, the hardware reset generating circuit transferring a first hardware reset signal to the judgement-combination circuit and the hardware reset combination circuit when a hardware reset function is selected, and the booting method comprising the steps of:

(a) judging whether or not the CPU is in a crash state, and going to step (b) if yes;

(b) judging whether the hardware reset function or the software reset function is selected, going to step (c) the software reset function is selected, and going to step (d) when the hardware reset function is selected;

(c) causing the judgement-combination circuit to control the hardware reset combination circuit so as to output a second hardware reset signal to the CPU to reboot the CPU, and going to step (e) after the judgement-combination circuit receives the software reset signal and finds that the CPU is in the crash state;

(d) causing the hardware reset combination circuit to output the second hardware reset signal to the CPU so as to reboot the CPU, and going to step (e) after the hardware reset combination circuit receives the first hardware reset signal;

(e) causing the CPU to receive a judgement signal output from the judgement-combination circuit after the CPU is rebooted, going to step (f) if the CPU finds that the second hardware reset signal is an indication signal to replace the software reset signal according to the judgement signal, and going to step (g) if the CPU judges that the second hardware reset signal represents the indication signal for executing an hardware reset operation according to the judgement signal;

(f) judging whether or not the data in the memory is correct, holding the data and predefined values of the memory to make the computer system return to a setting state before the CPU crash and thus complete the warm boot if yes, and going to step (g) if not; and (g) deleting the data and predefined values of the memory to make the computer system return to a default state and thus complete the cold boot, and ending this method.

8. The booting method according to claim 7, wherein the computer system is a PDA (personal digital assistant), the memory is an SDRAM (Synchronous Dynamic Random Access Memory), and an operation of the PDA is a WinCE system.

9. The booting method according to claim 7, wherein the step (a) further comprises:

judging that the user wants to execute the hardware reset function or the software reset function if the CPU is not in the crash state;

causing the CPU to receive the software reset signal, execute a software reset operation, and initialize the judgement-combination circuit when the user wants to execute the software reset function; and causing the hardware reset combination circuit to receive the first hardware reset signal and output the second hardware reset signal to enable the CPU to execute the hardware reset operation when the user wants to execute the hardware reset function.

10. The booting method according to claim 7, wherein the step (e) further comprises:

causing the CPU to initialize the judgement-combination circuit.

* * * * *